Figure 1:
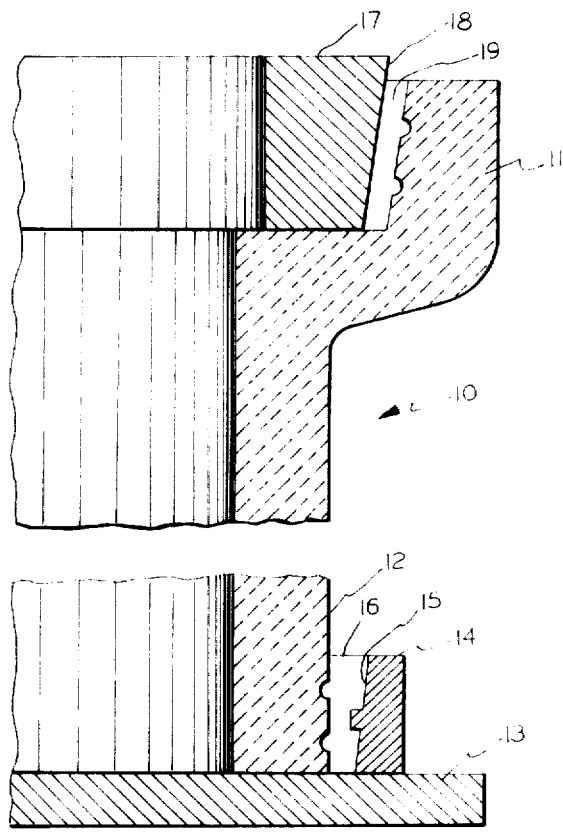

United States Patent

[11] 3,591,191

| [72] | Inventors | Richard A. Coderre<br>St. Louis Park;<br>Robert H. Leitheiser, Jordon, both of,<br>Minn. |
|---|---|---|
| [21] | Appl. No. | 724,994 |
| [22] | Filed | Apr. 29, 1968 |
| [45] | Patented | July 6, 1971 |
| [73] | Assignee | Ashland Oil Inc.<br>Houston, Tex. |

[54] PIPE HAVING A SEALING RING OF A THERMOSET EMULSION
10 Claims, 2 Drawing Figs.

[52] U.S. Cl. .................................................. 277/207,
260/29.6, 260/861
[51] Int. Cl. ........................................................ F16j 15/00
[50] Field of Search ............................................... 277/207;
260/29.2, 29.6, 861, 2.5

[56] References Cited
UNITED STATES PATENTS

| 3,256,219 | 4/1966 | Will | 260/2.5 |
| 2,955,322 | 10/1960 | Hite | 277/207 B UX |
| 2,986,411 | 5/1961 | Anderson | 277/207 B UX |
| 3,135,519 | 6/1964 | Ligon et al. | 277/207 B UX |
| 3,206,441 | 9/1965 | Bonin et al | 260/29.6 X |
| 3,237,954 | 3/1966 | Franklin | 277/207 B UX |
| 3,442,842 | 5/1969 | Bonin et al. | 260/29.6 X |

FOREIGN PATENTS

| 668,250 | 8/1963 | Canada | 277/207 B |

*Primary Examiner*—Laverne D. Geiger
*Assistant Examiner*—Robert I. Smith
*Attorneys*—Sherman J. Kemmer, William G. Ewert, Larry W. Evans and Plumley, Tyner and Sandt

ABSTRACT: A pipe having attached to at least one end thereof a joint-forming annular ring of a thermoset emulsion. The ring has a configuration to mate with another pipe whose end has a configuration to couple with the ring to form in the presence of a gasket a complete, tight-fitting pipe joint. The thermoset emulsion is a water-in-oil emulsion comprising:
  1. water as the discontinuous phase,
  2. a polymerizable mixture as the continuous phase, comprising:

a. an unsaturated polyester such as one produced by use of an alpha, beta-ethylenically unsaturated polycarboxylic acid, and a copolymerizable solvent such as styrene.

PATENTED JUL 6 1971

3,591,191

RICHARD A. CODERRE
ROBERT H. LEITHEISER
INVENTOR

BY *Rumley, Wynne & Sandt*
ATTORNEYS

PIPE HAVING A SEALING RING OF A THERMOSET EMULSION

Many types of pipes, and particularly those of the bell and spigot type, cannot be held to close dimensions during manufacturing. This results in pipes having dimensions which vary from pipe to pipe. Additionally, the ends of a single pipe are frequently out of round. In order to facilitate connecting sections of pipe, it is conventional practice to provide each end with a ring of hardened material having a facing surface held to close dimensional tolerances and to obtain a leak-free joint through incorporation of a gasket such as a rubber O-ring. In the past these hardened rings have been constructed of a wide variety of hardenable substances such as melted mixtures of sulfur and silica flour and polymerizable mixtures of unsaturated polyesters and styrene. However, these hardenable materials have not proven altogether satisfactory for a wide variety of reasons.

It is therefore an object of the present invention to provide a novel pipe having thereon one or more rings having facing surfaces held to close dimensional tolerances.

Another object of the present invention is to provide a novel method of forming a close tolerance pipe joint end.

The above and other objects are accomplished according to the present invention by employing as the hardenable material an unpolymerized water-in-oil emulsion comprising (1) water as the discontinuous phase, and (2) a polymerizable mixture as the continuous phase, comprising: (a) an unsaturated polyester and (b) a copolymerizable solvent such as styrene. The emulsion is polymerized in situ to form a ring of close dimensional tolerances.

Emulsions are two-phase systems consisting of a discontinuous phase of discrete droplets surrounded by a continuous phase. When the continuous phase is oil, the emulsion is termed "water-in-oil." "Oil," in this context, includes organic materials which are immiscible with water and which otherwise meet the requirements of the "oil phase" of the emulsions described herein.

The polyesters useful in the present invention are those which (1) contain ethylenic unsaturation, (2) are soluble in a vinyl monomer, and (3) form emulsions either with or without the addition of an emulsifying agent. These polyesters can be produced by procedures well known in the art by heating at esterification temperatures polyhydric alcohol and polycarboxylic acid a portion of which is an alpha, beta-ethylenically unsaturated polycarboxylic acid.

Examples of suitable polycarboxylic acids include, among others oxalic, malonic, adipic, isophthalic, tetrachlorophthalic, phthalic, their extant anhydrides and mixtures thereof. Examples of suitable alpha, beta-ethylenically unsaturated polycarboxylid acids include, among others maleic, fumaric, itaconic, their extant anhydrides and mixtures thereof. These latter acids are employed in an amount sufficient to render the polyester cross linkable by a vinyl monomer, and generally comprise from 10 to 100, preferably 20 to 100, weight percent of the polycarboxylic acid.

The polyhydric alcohols which can be reacted with the polycarboxylic acids in order to give polyesters useful in the present invention are preferably the diols, examples of which include, among others, ethylene glycol, diethylene glycol, triethylene glycol, 1, 2-propylene glycol, 1, 2- or 1,3-dipropylene glycol, tripropylene glycol, 1,3-propylene glycol, 1,3-butylene glycol, 1,2-butylene glycol, neopentyl glycol, 1,3-pentanediol, and 1,5-pentanediol. Higher polyhydric alcohols such as trimethylol propane and pentaerythritol can be used in minor amounts which do not materially alter the linear nature of the polyester. The polyhydric alcohols are generally employed in a stoichiometrically equivalent or slightly excess amount with respect to the polycarboxylic acid, and generally comprise from 30 to about 55 percent by weight of the polyester.

Suitable copolymerizable solvents, usually vinyl monomers, are those which are miscible with the polyester and which cure to form an intractible polymerized emulsion. Any vinyl monomer found to be coreactive with unsaturated polyesters can be employed. Examples include, among others, vinyl aromatics such as vinyl toluene and styrene, substituted styrenes such as alpha-methyl styrene, esters such as ethyl acrylate, methyl acrylate, methyl methacrylate, vinyl acetate, trialkyl cyanurate, diallyl phthalate, etc., and vinyl ethers such as methyl vinyl ether and ethyl vinyl ether, acrylonitrile methacrylamide and compatible mixtures thereof. The vinyl monomer can be employed in a weight ratio with respect to the polyester of from 10:1 to 1:9, and preferably from 3:1 to 1:2.

Although the water phase will generally be water, solutions of noninterfering organic and/or inorganic materials can be used. Examples of inorganic materials include, among others, sodium hydroxide, calcium carbonate, and sodium chloride such as sea water. Examples of organic materials include, among others, methyl alcohol and ethylene glycol. Many of these materials lower the freezing point of the polymerized emulsion and impart increased freeze-thaw resistance to the thermoset emulsions used in the pipes of the present invention. Amounts of water or aqueous solution from 10 to 95 weight percent, preferably from 40 to 85 weight percent and most preferably from 45 to 65 weight percent, based on the total amount of water or aqueous solution and mixture of polyester and vinyl monomer, can be present in the final emulsion.

The emulsifying agent, when used, must be of the lipophilic type in order to effect the formation of a water-in-oil emulsion. These emulsifying agents generally have hydrophile-lipophile balance (HLB) numbers of 2 to 8 and preferably 3 to 5. Examples of such emulsifying agents include, among others, the glycerol monostearates, sorbitan sesquioleate, polyoxyethylene sorbitol oleate, and mixtures thereof. These emulsifying agents are used in the minimum amount sufficient to effect formation of the desired emulsion and generally comprise from 0.1 to 10, preferably 0.5 to 5, weight percent based on the combined weight of polyester, solvent, and water.

The oil phase can be cured by means of any free radical generating catalyst heretofore employed to cause addition polymerization of vinyl monomers with unsaturated polyesters. Examples of suitable catalysts include, among others, the organic peroxides such as methyl ethyl ketone peroxide, benzoyl peroxide, and di-$t$-butyl peroxide, as well as the azonitriles. The catalyst is employed in an amount sufficient to catalyze the cross-linking reaction and cause it to proceed at the desired rate, and generally comprises from 0.001 to 10 weight percent based on the weight of the vinyl monomer. Promoters such as cobalt naphthenate, dimethyl aniline, or p-dimethyl toluidine can be employed to aid generation of free radicals by the catalyst. To prevent premature gelation, free radical traps such as hydroquinone can be employed, as is well-known in the art. The emulsions useful in the present invention can be formed by a wide variety of processes. In general, it is necessary only to put the components in a vessel and stir mechanically or by hand until the components emulsify. In a particularly preferred method of forming the emulsion continuously, the polyester, vinyl monomer solvent and promoter are premixed and placed in a first reservoir. In a second reservoir is placed water, and in a third reservoir is placed catalyst. Each of the reservoirs is equipped with a pump at its outlet and the outlet streams from each are metered into a mixing chamber (wherein the impeller develops a relatively high shear) in which the three streams are emulsified. The mixing chamber outlet is then merely equipped with a delivery tube which can be directed toward a location where the emulsion is to be cured.

Figure 2:
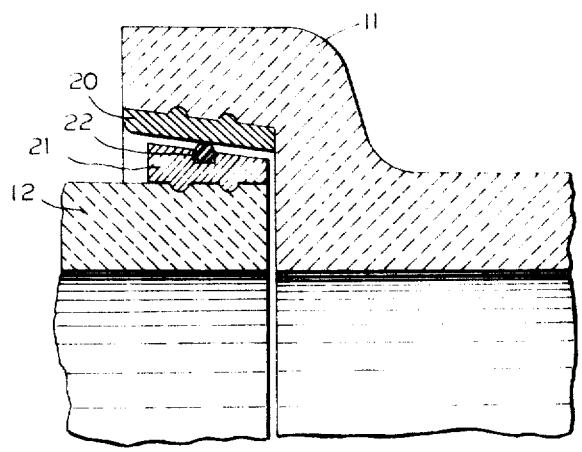

The invention may be better understood by reference to the drawings wherein FIG. 1 is a longitudinal sectional view taken through a bell and spigot pipe standing on a support prior to the application of the hardenable material, and wherein FIG. 2 is a horizontal sectional view of a portion of the bell end of one pipe connected to the spigot end of another pipe.

Referring now to the drawings, and in particular to FIG. 1, there is shown a pipe 10 having a bell end 11 and a spigot end 12. The spigot end 12 rests upon a support 13. Around the spigot end 12 is a collar mold ring 14, the surface 15 of which is of close dimensional tolerance. The space between the collar mold ring 14 and the spigot end 12 of the pipe 10 is a liner mold 16. Within the bell end 11 of the pipe 10 is a liner mold ring 17 having a surface 18 of close dimensional tolerance. The space between the liner mold ring 17 and the bell end 11 of the pipe 10 defines a mold 19. When one of the above-described unpolymerized, polymerizable emulsions is poured into the molds 16 and 19 and permitted to harden, the result will be rings having surfaces held to close tolerances.

Referring now to FIG. 2, there is shown the bell end 11 of one pipe connected to the spigot end 12 of another pipe. The bell end 11 has a liner 20 and the spigot end 12 has a collar 21. Between the liner 20 and the collar 21 is a gasket 22 of any resilient sealing material.

In accordance with the present invention, rings of close dimensional tolerances in the form of either liners or collars can be applied to one or more ends of a pipe to form a wide variety of specific structures and by a wide variety of methods such as those described in U.S. Pat. No. 1,979,470; No. 2,401,554; No. 2,537,659; No. 2,955,322; No. 3,219,516; and No. 3,251,603, the disclosures of which are incorporated herein by reference. The pipe can be made of clay, cement, cast iron, stone ware, petrified tile, porcelain, and the like.

The invention may be better understood by reference to the following examples in which all parts and percentages are by weight unless otherwise indicated. These examples are illustrative of certain embodiments designed to teach those skilled in the art how to practice the invention and to represent the best mode contemplated for carrying out the invention, and are not intended to limit the scope of the invention in any manner.

EXAMPLE 1

This example illustrates the continuous production of polymerized water-in-oil emulsions at various water levels.

The apparatus, used in this example, consists of four electric motor-driven pumps and piping to connect them. Three of the pumps were connected to the outlets of three reservoirs and serve to continuously meter liquid from the three reservoirs to the fourth pump, an Eastern Centrifigal Pump (3,400 r.p.m.) which was used as a high-shear mixing chamber. The three reservoirs contained, respectively, (1) a mixture of polyester, styrene and catalyst, (2) water and (3) promoter (dimethyl toluidine). To reservoirs (1) and (2) were connected a "Zero-Max" 0—400 r.p.m. variable speed gear drive and an Ecco proportioning pump. To reservoir (3) was connected a "finger" pump controlled by a "Zero-Max" variable speed gear drive. The contents of reservoir (1) were pumped directly to the mixing pump while the contents of reservoir (3) were pumped into the line from reservoir (2) just before this line enters the mixing pump.

A series of 6 pound pours were made to test the flex strength and compressive strength of polymerized emulsions wherein the copolymerizable oil phase was Aropol Q-6300 (an unsaturated polyester marketed by Archer Daniels Midland Co. comprising a dipropylene glycol ester of maleic anhydride) in a 50 percent solution with styrene and no emulsifier. The catalyst used was 1 percent benzoyl peroxide powder, and the promoter was 0.5 percent dimethyl toluidine diluted 1:5 with styrene.

The polyester, styrene and benzoyl peroxide powder were premixed and transferred to reservoir (1). Water was poured into reservoir (2) and the dimethyl toluidine-styrene solution was poured into reservoir (3). The "Zero-Max" units at the outlets of the three reservoirs were adjusted to give the desired percentages of oil, water and promoter, and the mixing pump was turned on. The valves to the water and polyester solution lines were opened. When flow was detected in the delivery tube from the mixing pump, the water pump was switched on and emulsion began to flow through the delivery tube. The tube was then held over the container to be filled. Runs were conducted at water levels of 20, 30, 40, 50, 60, 70 and 80 percent to produce Emulsions A through G inclusive respectively.

EXAMPLE 2

This example illustrates the synthesis of a preferred unsaturated polyester useful in the present invention.

The following quantities of the following ingredients are combined as described:

| | Ingredient | Quantity (grams) |
|---|---|---|
| Item: | | |
| A | Maleic anhydride | 100 |
| B | Isophthalic anhydride | 325 |
| C | Diethylene glycol | 380 |

Items A through C are charged to a round-bottom flask equipped with a thermometer, a mechanical stirrer, and a Dean-Stark water separation trap. The flask and its contents are heated for 72 hours at 390° F. until water (90 gm.) is removed and the acid number of the reaction product has dropped to below 20. The resultant polyester is termed Polyester H.

EXAMPLE 3

This example illustrates the synthesis of additional emulsions useful in the present invention.

Polyester H (10 lbs.) is mixed respectively with the amount of styrene shown in Column 2 of Table II and the amount of water shown in Column 3 of Table II wherein the water contains the amounts of additives shown in Column 4 of Table II. To this mixture is added 1.25 percent cobalt octoate, 0.5 percent dimethylaniline, and 0.5 percent methyl ethyl ketone peroxide, wherein all percentages are based on the combined weight of polyester plus styrene. Certain properties of the hardening and the hardened emulsion are measured and recorded in Columns 5—10 of Table II.

TABLE II

| 1 | 2 | 3 | 4 | | | 5 | 6 | 7 | 8 | | | 9 | 10 |
|---|---|---|---|---|---|---|---|---|---|---|---|---|---|
| | | | Additive | | | | | | | | | | Impact strength (Gardner), in./lbs. |
| | Styrene, weight percent [1] | Water, weight percent [2] | NaOH, weight percent [3] | NaCl, weight percent [3] | NaHCO₃, weight percent [3] | Gel time, min. | [TPE], min. | [PE], °F. | Hardness Shore A at— | | | Shrinkage, percent | |
| Polyester | | | | | | | | | 5 min. | 10 min. | 15 min. | | |
| H | 50 | 60 | 0 | 0 | 0 | 23 | 12 | 160 | 0 | 65 | 83 | 2.5 | 12 |
| H | 45 | 55 | 0.1 | 0 | 0 | | | | | | | 0.8 | 22 |
| H | 50 | 60 | 0 | 20 | 1 | 2.6 | 12 | 154 | | 65 | 85 | 1.4 | ⁴14 |
| H | 45 | 55 | 0 | 20 | 1 | 2.3 | 12 | 154 | 10 | 55 | 85 | 0.6 | ⁴12 |
| H | 50 | 60 | .15 | 20 | 0 | 5 | 32 | 150 | | | | 0.9 | 12 |
| H | 50 | 60 | .15 | 20 | 0 | 3.5 | 20 | 164 | | | | 0.9 | ⁴14 |

[1] Based on the combined weight of polyester and styrene.
[2] Based on the combined weight of polyester, styrene, and water.
[3] Based on the combined weight of water and additive.
[4] Star cracks appear, but sample did not shatter at 20 in./lbs.

EXAMPLE 4

This example illustrates the construction of a pipe of the present invention.

The emulsion described in the fourth line of Table II is prepared and immediately poured into molds similar to molds 16 and 19 shown in FIG. 1. After three minutes the liner mold ring 17 is removed and the pipe 10 is lifted from the support 13. The collar mold ring 14 is then removed by separating it into two pieces. After 15 minutes, two sections of such a pipe can be put together as shown in FIG. 2 with the aid of a gasket 22 in the form of an O-ring to form fluidtight seal.

EXAMPLE 5

The procedure of Example 4 is repeated except that the emulsion of the fourth line of Table II is replaced respectively with emulsions A through G with similar results.

Although the invention has been described in considerable detail with reference to certain preferred embodiments thereof, it will be understood that variations and modifications can be effected within the spirit and scope of the invention as described above and as defined in the appended claims.

What We claim is:

1. A pipe having attached to at least one end thereof a joint-forming annular ring of a thermoset emulsion, said ring having a configuration to mate with another pipe whose end has a configuration to couple with said ring to form in the presence of a gasket a complete, tight-fitting pipe joint wherein said thermoset emulsion is a polymerization product of a water in oil emulsion comprising:
   1. 40 to 85 percent by weight of water as the discontinuous phase,
   2. 15 to 60 percent by weight of a polymerizable mixture of the continuous phase, comprising:
      a. an unsaturated polyester and
      b. a copolymerizable solvent, in a weight ratio of (b) to (a) within the range of 10:1 to 1:9, said mixture being adapted to harden to a resilient, cross-linked solid.

2. The pipe of claim 1 wherein the emulsion also contains from 0.1 to 10 percent by weight of an emulsifier having an HLB value of 2 to 8.

3. The pipe of claim 1 wherein the polymerizable mixture comprises:
   a. an unsaturated linear polyester comprising the reaction product of an alpha, beta-ethylenically unsaturated dicarboxylic acid and a polyhydric alcohol and
   b. a copolymerizable vinyl monomer solvent.

4. The pipe of claim 3 wherein the copolymerizable vinyl monomer is styrene.

5. The pipe of claim 3 wherein the polyester is composed of from about 70 to about 45 percent by weight of said unsaturated dicarboxylic acid and from about 30 to about 55 percent by weight of said polyhydric alcohol.

6. The pipe of claim 5 wherein the unsaturated dicarboxylic acid is selected from the group consisting of maleic acid, fumaric acid, itaconic acid, equivalents thereof, their extant anhydrides, and mixtures thereof.

7. The pipe of claim 5 wherein the polyhydric alcohol is selected from the group consisting of ethylene glycol, diethylene glycol, triethylene glycol, 1,2-propylene glycol, 1,2-dipropylene glycol, 1,3-dipropylene glycol, tripropylene glycol, 1,3-propylene glycol, 1,3-butylene glycol, 1,2-butylene glycol, neopentyl glycol, 1,3-pentanediol, and 1,5-pentanediol.

8. The pipe of claim 7 wherein the continuous phase further comprises a free radical catalyst.

9. The pipe of claim 1 wherein an emulsifier having an HLB value of 2 to 6 is added to the continuous phase prior to emulsification.

10. The pipe of claim 9 wherein from 0.1 to 10 percent of the emulsifier is added.